United States Patent [19]

Hirase et al.

[11] Patent Number: 5,084,080
[45] Date of Patent: Jan. 28, 1992

[54] DEVICE FOR TRAPPING GASEOUS COMPOUNDS OF REFRACTORY METALS AND PUMPING PLANT INCLUDING SAME

[75] Inventors: Ikuo Hirase, Toyosato, Japan; Denis Rufin, Countryside, Ill.; Tooru Sumiya; Masamichi Matsuura, both of Hagisono, Japan

[73] Assignee: L'Air Liquide, Societe Anonyme pour l'Etude et l'Exploitation des Procedes Georges Claude, Paris, France

[21] Appl. No.: 276,540

[22] Filed: Nov. 28, 1988

[30] Foreign Application Priority Data

Nov. 30, 1987 [FR] France .................. 87 16575

[51] Int. Cl.⁵ .................. B01D 53/00; B01D 53/34
[52] U.S. Cl. .................. 55/267; 55/72; 422/174; 422/199
[58] Field of Search .................. 422/174, 199, 168; 55/267, 72

[56] References Cited

U.S. PATENT DOCUMENTS

| | | |
|---|---|---|
| 2,104,741 | 1/1938 | Fink .................. 422/199 X |
| 3,497,674 | 2/1970 | Zirngibl et al. .................. 422/199 X |
| 3,768,982 | 10/1973 | Kitzner et al. .................. 422/174 |
| 4,500,492 | 2/1985 | Yamakawa .................. 422/199 |
| 4,585,622 | 4/1986 | Bowe et al. .................. 422/199 X |

FOREIGN PATENT DOCUMENTS

| | | |
|---|---|---|
| 540286 | 4/1957 | Canada .................. 422/199 |
| 1161676 | 9/1958 | France . |
| 237951 | 8/1986 | German Democratic Rep. . |

Primary Examiner—Richard L. Chiesa
Attorney, Agent, or Firm—Oblon, Spivak, McClelland, Maier & Neustadt

[57] ABSTRACT

A device for trapping gaseous compounds of refractory metals includes at least a vertically disposed elongated enclosure (1) in the form of a hollow cylindrical member (2), sealingly closed in its upper part via a cover (4), and having a hollow bottom (5) in its lower part. The enclosure is lined in the major part of the height of the member with a heat conductive lining (10) leaving within itself free vertical spaces from top to bottom; The enclosure includes a gas inlet opening (8) below the lower portion of the lining, a gas outlet opening (11) above the lining, a heater and heat insulation.

9 Claims, 2 Drawing Sheets

DEVICE FOR TRAPPING GASEOUS COMPOUNDS OF REFRACTORY METALS AND PUMPING PLANT INCLUDING SAME

BACKGROUND OF THE INVENTION

1. Field of the Invention

The present invention concerns a device for trapping gaseous compounds of refractory metals, and a pumping plant comprising such a device.

2. Description of the Related Art

In the industry of electronic components, in particular, and in the process of vapor phase deposit, numerous deposits of refractory metals and of their silicides are made from gaseous compounds of refractory metals, such as W, Mo, Ti, for example in the form of fluorides.

The gaseous effluents resulting from these processes contain in particular corrosive gaseous compounds (HF, $F_2$, ...) and unreacted gaseous compounds such as fluorides of refractory metals ($WF_6$, ...).

These effluents are generally extracted from plants which are for example used in vapor phase chemical deposits, by pumping in vacuum pumps, such as oil pumps, which are mechanically degraded by these effluents, and in which the oil is also degraded.

Devices for washing the effluents used for absorbing noxious gases, or for decomposing gaseous compounds used to this date have been found to be unsatisfactory.

SUMMARY OF THE INVENTION

The present invention concerns a device for the trapping of these compounds by thermic decomposition, characterized in that it comprises at least a vertically disposed elongated enclosure formed of a hollow cylindrical member, sealingly closed in its upper part by means of a cover and having a hollow bottom in its lower part, said enclosure being lined in the major part of its height with a heat conductive lining leaving within itself free vertical spaces from top to bottom; said enclosure comprising a gas inlet opening below the lower portion of the lining and a gas outlet opening above the lining; said enclosure comprising a gas outlet opening in its upper portion and a gas inlet opening in its lower portion; said enclosure being provided with heating means and eventually heat insulating means.

Such a device is particularly useful for the treatment of gaseous effluents resulting from processes involving refractory metals.

This is the reason why the present invention also concerns a plant for pumping these gases comprising a device according to the invention.

BRIEF DESCRIPTION OF THE DRAWINGS

The invention will be better understood from reading the detailed description which follows and in view of the annexed drawings in which.

DETAILED DESCRIPTION OF THE PREFERRED EMBODIMENTS

Figure 1:
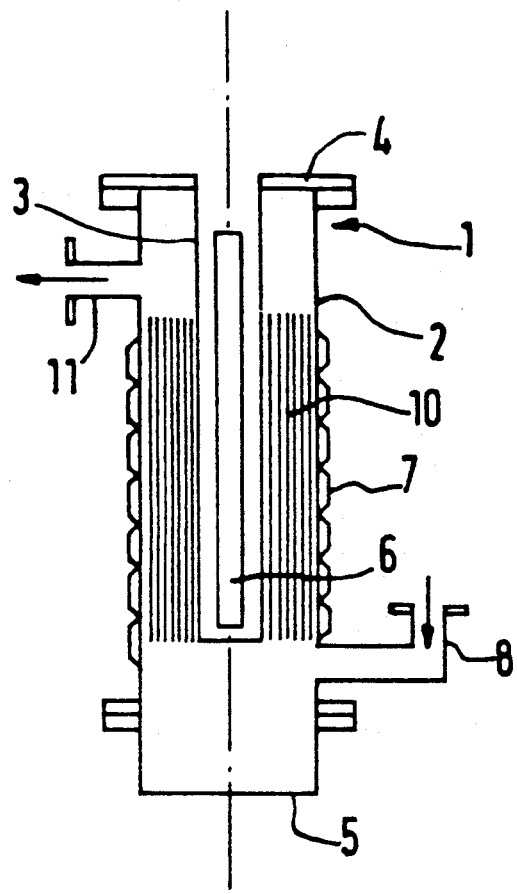
FIG. 1 represents a schematic section of a device according to the invention.

As shown in FIG. 1, a vertically disposed cylindrical enclosure (1) of Ni-Cr alloy is made of a hollow member (2) carrying an annular cover (4) and having a hollow bottom (5) defining a collector. The annular cover (4) sealingly closes the tubular space limited by the main body (2) and an auxiliary coaxial body (3).

An electrical resistance (6) is disposed inside the auxiliary body (3). Another electrical resistance (7) is wound around the main member (2). The electrical resistances (7) which can be used are flexible resistors known under the name RIBBON HEATER. These resistances have an electrical power of the order of some kw. The means for feeding these resistances are not represented.

These resistances will enable raising the enclosure to temperatures of the order of 350° to 850° C.

A sheet of copper 0.5 mm thick, wound to form a cylinder about 1 m high, Constitutes the lining (10) disposed in the annular space defined by the members (2, 3). The copper sheet is wound so as to leave free annular vertical spaces having a thickness of the order of 1 mm between the sheet windings.

A gas inlet (8) is provided below the lining, and a gas outlet opening (11) is provided above the lining.

Although this is not showon in the figure, the enclosure can also be provided with heat insulating means, for example fiber glass insulation, disposed in a sheath all around the enclosure.

Moreover, as a variant, the bottom (5), which sealingly closes the bottom of the enclosure is removable.

Figure 2:
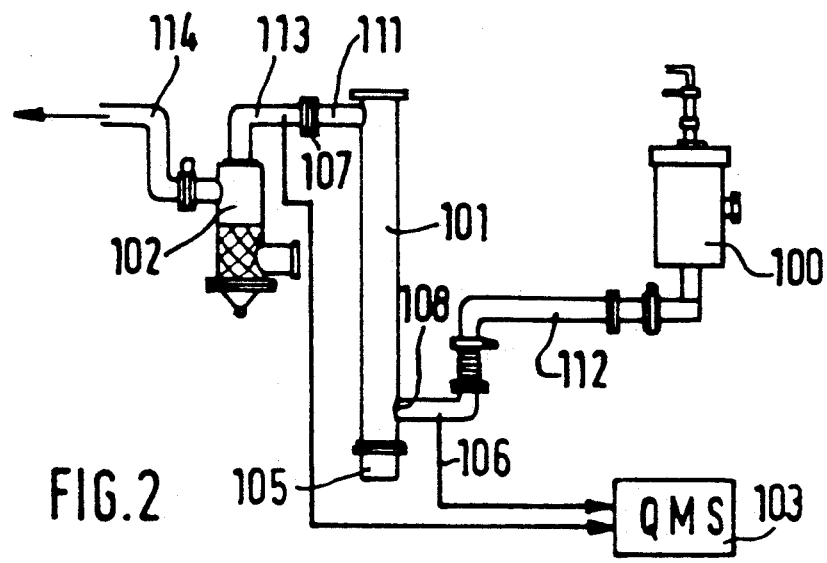
FIG. 2 is a schematic representation of a plant for vapor phase chemical depositing comprising a device according to the invention and means for analyzing gaseous effluents upstream and downstream of the device according to the invention.
Figure 6:
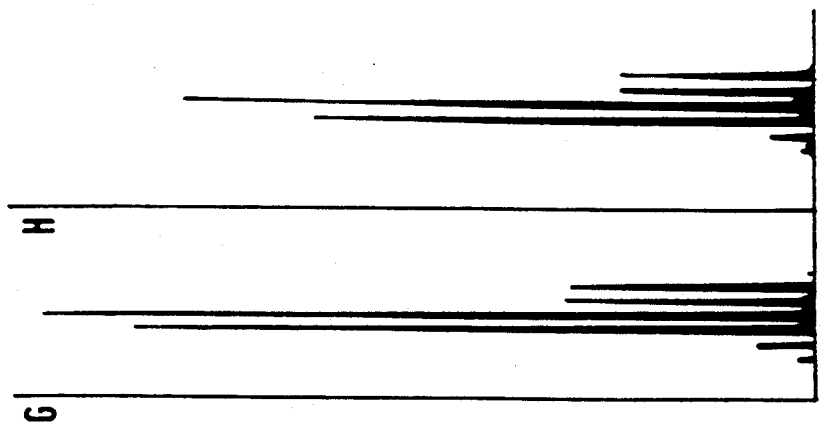
FIGS. 3 to 6 represent spectrometric analyses showing the efficiency of the device according to the invention.
Figure 4:
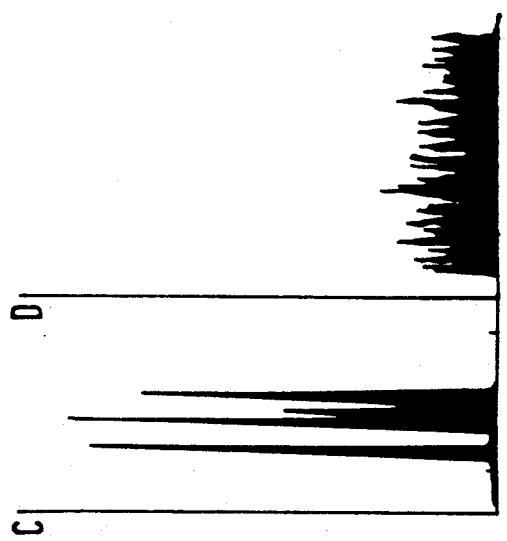
Figure 5:
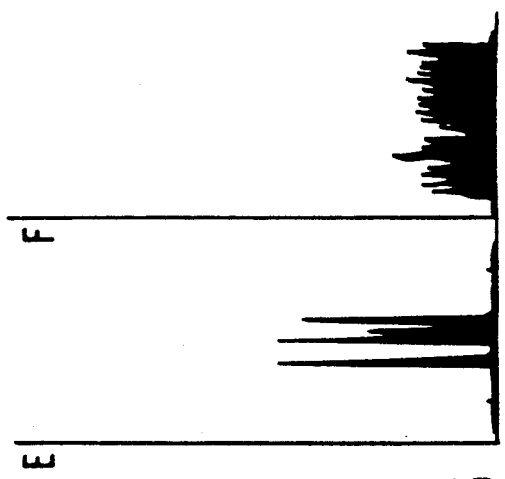
Figure 3:
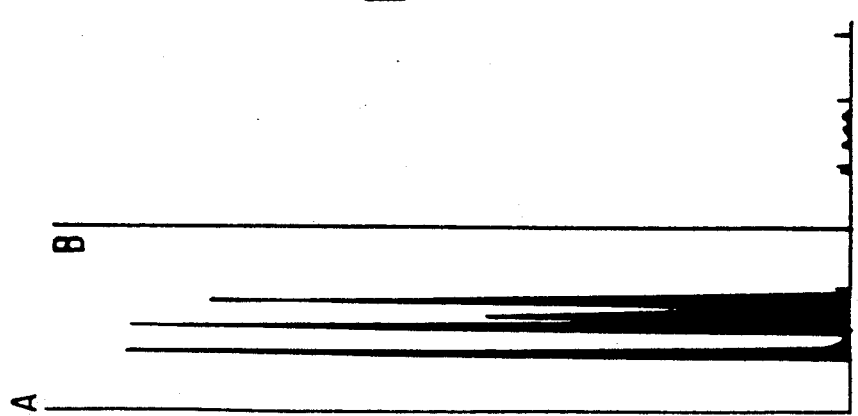

On FIG. 2, there is represented a plant of vapor phase deposit comprising a device according to the invention.

The effluents of a reaction chamber (100) are led, by means of a channel (112), to the device (101) according to the invention, represented here as provided with its insulating sheath, and with a removable collecting bottom (105). They are introduced at the bottom of the enclosure by means of the inlet opening (108).

After passing through the device (101) according to the invention, the effluents are rejected by means of the outlet opening (111) and are led through a channel (113) to an oil trap (102) through which they pass before reaching pumping devices not represented through a channel (114).

A guadripolar mass spectrometer analyser (OMS) (103) picks up samples of gases at a point (106) of the channel (112) located upstream of the device (101) and at a point (107) of the channel (113) located downstream of the device (101).

The effluent gases of the reaction chamber are decomposed on the copper sheets forming the lining at a temperature of about 500° C.

The following reactions are examples of reactions which can take place at the temperature reached in this device (350° C.–850° C.):

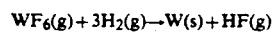
$WF_6(g) + 3H_2(g) \rightarrow W(s) + HF(g)$

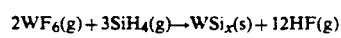
$2WF_6(g) + 3SiH_4(g) \rightarrow WSi_x(s) + 12HF(g)$

$SiH_4(g) \rightarrow Si(s) + 2H_2(g)$

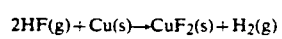
$2HF(g) + Cu(s) \rightarrow CuF_2(s) + H_2(g)$

The metals and solid components are deposited on copper and the gases are pumped towards the outside.

The deposits on copper can be eliminated by means of vibrations induced on the device, and fall by gravitation in the free vertical spaces between the sheets of the lining and are collected in the collector. Those which are entrained with the gas will be trapped in traps for solid material.

As it will appear in the examples which follow, tungsten fluorides can be destroyed at 999° C. by means of a device according to the invention.

EXAMPLE

Mixtures of $WF_6$, $H_2$ and $SiH_4$ whose composition appears in the following tables are allowed to be passed through a device according to the invention.

The spectrometric analyses of $WF_5+$(A to F) and of corresponding $SiH_4+$(G, H) are represented in FIGS. 3 to 6.

| SPEC-TRUM | NF cm$^3$ | H$_2$ cm$^3$ | SiH$_4$ cm$^3$ | BEFORE SENSITIVITY | AFTER SENSITIVITY |
|---|---|---|---|---|---|
| A | 5 | 0 | 0 | $10^{-9}$ | / |
| B | 5 | 0 | 0 | / | $10^{-9}$ |
| C | 5 | 500 | 0 | $10^{-9}$ | / |
| D | 5 | 500 | 0 | / | $10^{-10}$ |
| E | 5 | 0 | 100 | $10^{-9}$ | / |
| F | 5 | 0 | 100 | / | $10^{-10}$ |
| G | 0 | 950 | 100 | $10^{-7}$ | / |
| H | 0 | 950 | 100 | / | $10^{-7}$ |

For tests A-B and C-D, more than 99% of $WF_6$ injected is trapped in the form of W (s).

For tests E-F, 99% of gaseous $WF_6$ is trapped in the form of $WSi_x$ (s).

For tests G-H, 20% of $SiH_4$ is trapped in the form of Si (s).

Rotary pumps provided with usual mineral oil have been used for two years at the outlet of a reactor with cold walls in a process of chemical deposit in gaseous phase of W, $WSi_x$ without changing the oil.

We claim:

1. Device for trapping gaseous components of refractory metals, comprising at least one vertically disposed elongated enclosure formed of a hollow cylindrical member sealingly closed by means of a cover in an upper part thereof and by means of a hollow bottom in a lower portion thereof, said enclosure being lined in a major portion of the height of said cylindrical member with a heat conductive lining exposed to a gas to be treated, said lining defining free vertical spaces from top to bottom; said enclosure comprising a gas inlet below a bottom of said lining and a gas outlet opening above said lining; said enclosure being provided with heating means and heat insulating means, wherein the lining comprises at least one wound metallic sheet defining a cylinder which is parallel to said hollow cylindrical member and whose outer diameter is substantially equal to the inner diameter of said hollow cylindrical member.

2. Device according to claim 1, wherein the lining is a hollow cylinder and that the enclosure comprises an auxiliary body, which is closed in the lower portion thereof at a height substantially the same as that of said lining, and which is located on the axis of said enclosure in the free space of the cylindrical lining, the cover of the annular enclosure sealingly closing said enclosure.

3. Device according to claim 1 wherein the lining comprises a copper sheet.

4. Device according to claim 3 wherein the copper sheet has a thickness of about 0.5 mm and the free spaces between the sheets have a thickness of the order of one mm.

5. Device according to claim 1 wherein the height of the lining is about 1 m, and the inner diameter of the enclosure is about 0.20 m and the diameter of the auxiliary body is of the order of 0.08 m.

6. Device according to claim 1 wherein the heating means comprises an electrical resistance mounted in the auxiliary body and/or an electrical resistance wound outside the main body.

7. Device according to claim 1 wherein the hollow bottom of the enclosure is removable.

8. Device according to claim 1 wherein the enclosure is made of a Ni-Cr alloy.

9. Device according to claim 1, wherein said lining is formed of copper.

* * * * *